United States Patent [19]
Kitai

[11] Patent Number: 6,069,677
[45] Date of Patent: May 30, 2000

[54] LIQUID CRYSTAL DISPLAY DEVICE AND LIQUID CRYSTAL PROJECTOR USING SAME

[75] Inventor: Hisao Kitai, Kanagawa, Japan

[73] Assignee: Sony Corporation, Japan

[21] Appl. No.: 09/025,832

[22] Filed: Feb. 19, 1998

[30] Foreign Application Priority Data

Feb. 20, 1997 [JP] Japan ................................. 9-036352

[51] Int. Cl.$^7$ ........................ G02F 1/1335; G02F 1/1333
[52] U.S. Cl. ............................ 349/111; 349/5; 349/110; 349/158
[58] Field of Search ................................. 349/111, 110, 349/5, 14, 158, 161

[56] References Cited

U.S. PATENT DOCUMENTS

| | | | |
|---|---|---|---|
| 5,282,070 | 1/1994 | Nishida et al. | 349/111 |
| 5,508,834 | 4/1996 | Yamada et al. | 349/110 |
| 5,771,082 | 6/1998 | Chaudet et al. | 349/111 |
| 5,781,260 | 7/1998 | Miyazawa | 349/111 |
| 5,786,876 | 7/1998 | Ota et al. | 349/111 |
| 5,811,866 | 9/1998 | Hirata | 349/100 |

*Primary Examiner*—William L. Sikes
*Assistant Examiner*—Dung Nguyen
*Attorney, Agent, or Firm*—Ronald P. Kananen; Rader, Fishman & Grauer

[57] ABSTRACT

A liquid crystal display device and a liquid crystal projector using the same are provided for suppressing reduction in liquid crystal properties due to heat and light by precisely shielding light in regions other than a region irradiated with light corresponding to effective pixels. Light-shielding substrates are each brought to absolute contact with a back of a drive substrate and a front of an opposed substrate, respectively. One of the light-shielding substrates is provided with a frame-shaped light-shielding film formed in a region on a surface of a transparent substrate opposed to a non-irradiated region in the drive substrate. Similarly, the other of the light-shielding substrates is provided with a frame-shaped light-shielding film formed in a region on a surface of a transparent substrate opposed to a non-irradiated region in the opposed substrate. The light-shielding films each have an excellent light-shielding property with optical density of 3.0 or above, for example. The light-shielding films are thinly formed in order to suppress stress strain, that is, warpage of glass, due to an adhesive for bonding the light-shielding films to the drive substrate and the opposed substrate, respectively. The light-shielding films are made of a conductive film such as aluminum (Al) and grounded. As a result, the light-shielding films have a function of electrically shielding the liquid crystal display device besides the light-shielding function.

14 Claims, 3 Drawing Sheets

LIQUID CRYSTAL DISPLAY DEVICE AND LIQUID CRYSTAL PROJECTOR USING SAME

BACKGROUND OF THE INVENTION

1. Field of the Invention

The present invention relates to a liquid crystal display device having a light-tight structure and a liquid crystal projector using the same.

2. Description of the Related Art

Liquid crystal displays include direct-view type displays and projection displays (referred to as liquid crystal projectors in the following description) for throwing an image onto a screen for display. The liquid crystal projectors include color liquid crystal projectors. The color liquid crystal projectors allow light emitted from a single white light source to be separated into three primary colors for color display by a color separating means. Each primary color light is then introduced to pixels (liquid crystal cells) of a liquid crystal display device corresponding to each color. The light is modulated therein in accordance with an image to be reproduced to be projected onto a screen for color image display. Such liquid crystal projectors fall into two broad categories: single-panel and triple-panel types. The single-panel type comprises a single liquid crystal display device (liquid crystal panel) having a color separating means for red, green and blue such as a dichroic mirror. The triple-panel type comprises a total of three monochrome liquid crystal panels each placed in an optical path of the respective colors, that is, red, green and blue.

The liquid crystal projectors as described so far generally have a metal halide lamp emitting intense light, for example, for a light source. The light emitted from the metal halide lamp is reflected forward by a spheroidal reflecting mirror. In front of the light source a heat-ray cut-off filter, an incident polarizing plate and a condenser lens are placed in this order. In front of the condenser lens a liquid crystal display device, an outgoing polarizing plate, a projection lens and a projection screen are placed. The heat-ray cut-off filter removes unwanted infrared radiation from the intense light emitted from the light source (the metal halide lamp). The light then passes the incident polarizing plate to be gathered by the condenser lens to enter the liquid crystal display device. The light is modulated therein in accordance with an image to be reproduced. The light modulated in the liquid crystal display device passes through the outgoing polarizing plate to be projected in magnification by the projection lens. An image is thereby projected onto the projection screen in front.

However, the liquid crystal projectors as described so far have problems resulting from heat produced by light from the light source. That is, a liquid crystal display device used in such liquid crystal projectors is on the order of 2 mm in thickness and relatively thin. As a result, when there are inconsistencies in intensity of light from the light source, the light may locally concentrate to partially heat the liquid crystal display device. That is, a 'hot spot' may be produced. The hot spot has a transmission factor different from surrounding regions. Therefore, the quality of a projected image in magnification will be reduced to a great extent. Another problem is that a temperature of the liquid crystal display device rises due to radiation heat from the light source and intensive light strikes drive elements where thin film transistors (TFT) and so on are formed. Both heat and light thus reduce liquid crystal properties and thereby the display function does not work properly.

Therefore, liquid crystal projectors of, the related art incorporate a mechanism for cooling a liquid crystal display device. For the cooling mechanism an air-cooling type for cooling by means of blowing air and a liquid cooling type for cooling with liquid are adopted.

However, air-cooling by blowing air also blows dust in a liquid crystal display apparatus. If dust settles on a liquid crystal display device and a lens, it will be projected onto a screen when projected by a liquid crystal projector. Furthermore, if air is increased for satisfactory cooling, noise also will increase due to high-speed rotation of a fan. The size of the fan may be further enlarged which will result in upsizing of the device. On the other hand, an example of the liquid-cooling type mechanism is disclosed in Japanese Patent Publication 6-58474 (1994). However, the liquid-cooling type requires liquid to be filled for a heat exchanging medium. This type therefore incorporates problems of reliability relating to release of pressure because of a rise in the temperature, air bubbles, mixing of foreign substances, leakage of cooling liquid and so on. For a water-cooling type in particular, the formation of rust and the like on metal parts is a problem, too. The liquid-cooling type requires upsizing of the cooling mechanism itself since a large amount of liquid is required for cooling. Another cooling system is a solid-cooling type equipped with an electronic cooling device such as a Peltier element. This type, however, increases costs of the overall liquid crystal projector while the cooling effect thereof is not satisfactory.

SUMMARY OF THE INVENTION

It is an object of the invention to provide a liquid crystal display device and a liquid crystal projector using the same for suppressing reduction in liquid crystal properties due to heat and light by precisely shielding light in regions other than a region irradiated with light corresponding to effective pixels and for reducing the size of a cooling mechanism.

A liquid crystal display device of the invention comprises: a first substrate having a region irradiated with light corresponding to effective pixels and a region not irradiated with light corresponding to regions other than the effective pixels; a second substrate having a region irradiated with light and a region not irradiated with light each opposed to the first substrate, placed to be opposed to the first substrate with a liquid crystal layer in between; and a light-shielding substrate having a light-shielding film formed on a transparent substrate to be opposed to the region not irradiated with light of at least one of the first and second substrates, brought to complete surface contact with at least one of the first and second substrates.

A liquid crystal projector of the invention is used for introducing light with a color from a light source to pixels of a liquid crystal display device, modulating the light with a color at the liquid crystal display device in accordance with an image to be reproduced and projecting the image onto a projection screen for display. The liquid crystal display device comprises a first substrate having a region irradiated with light corresponding to effective pixels and a region not irradiated with light corresponding to regions other than the effective pixels; a second substrate having a region irradiated with light and a region not irradiated with light each opposed to the first substrate, placed to be opposed to the first substrate with a liquid crystal layer in between; and a light-shielding substrate having a light-shielding film formed on a transparent substrate to be opposed to the region not irradiated with light of at least one of the first and second substrates, brought to complete surface contact with at least one of the first and second substrates.

In the liquid crystal display device of the invention, light incident over the region other than the region irradiated with light is shielded by the light-shielding film formed on the transparent substrate and brought to complete surface contact with the first or second substrate. As a result, a rise in the temperature of the liquid crystal device is suppressed.

In the liquid crystal projector of the invention, the light with a color from the light source is introduced to the pixels of the liquid crystal device. In the liquid crystal display device, light incident over the region other than the region irradiated with light is shielded by the light-shielding film formed on the transparent substrate and brought to complete surface contact with the first or second substrate. As a result, a rise in the temperature of the liquid crystal device is suppressed. Modulation of an image to be reproduced is therefore precisely performed in the liquid crystal display device and a high-quality image is displayed on the projection screen.

Other and further objects, features and advantages of the invention will appear more fully from the following description.

DETAILED DESCRIPTION OF THE PREFERRED EMBODIMENT

Preferred embodiments of the invention will now be described in detail with reference to the accompanying drawings.

Figure 1:
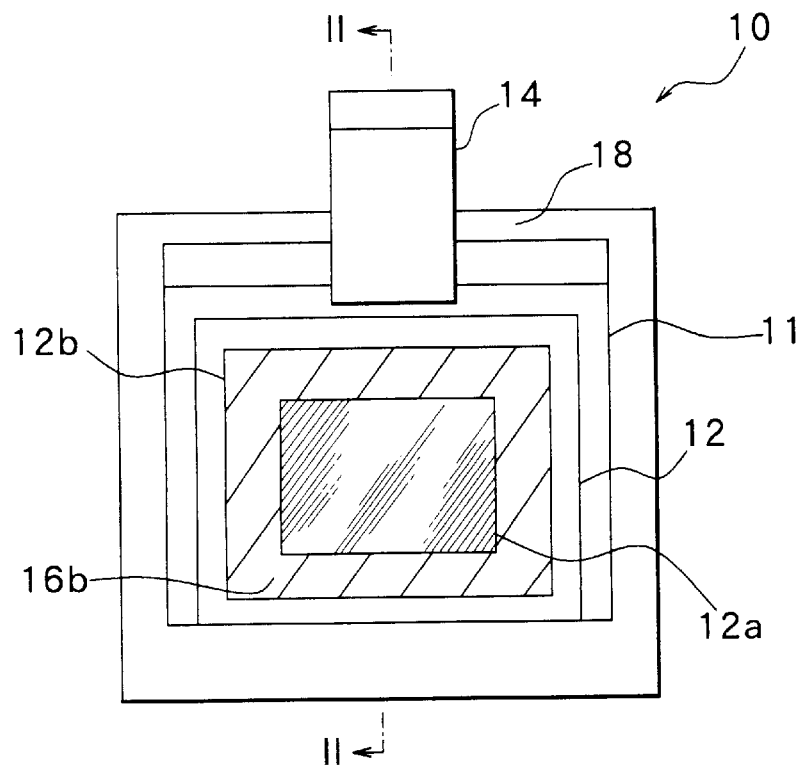
FIG. 1 is a front view of a liquid crystal display device of an embodiment of the invention.
Figure 2:
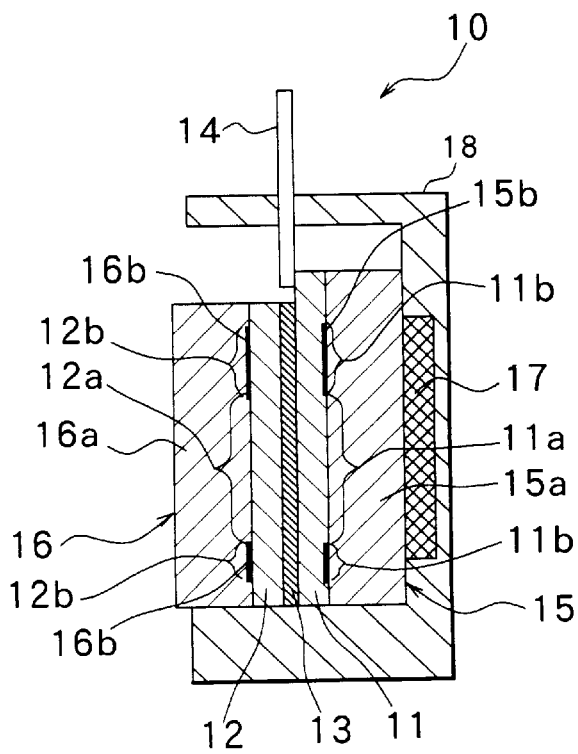
FIG. 2 is a cross section taken along line II—II in FIG. 1.

FIG. 1 and FIG. 2 each illustrate an embodiment of a liquid crystal display device according to of the invention. FIG. 1 is a front view of the liquid crystal display device 10. FIG. 2 is a cross section taken along line II—II in FIG. 1. The liquid crystal display device 10 comprises a drive substrate 11 as a first substrate and an opposed substrate 12 as a second substrate opposed to each other. A liquid crystal layer 13 is held between the drive substrate 11 and the opposed substrate 12. The drive substrate 11 is made of a transparent material such as glass. In a center thereof the drive substrate 11 comprises effective pixels wherein transparent pixel electrodes and switching elements (TFTs) are formed in a matrix, for example, for a plurality of pixels. Around the effective pixels peripheral circuits are formed, including a horizontal drive circuit and a vertical drive circuit. The effective pixels correspond to an irradiated region 11a irradiated with light. The peripheral circuits correspond to a non-irradiated region 11b not irradiated with light. The opposed substrate 12 is made of a transparent substrate like the drive substrate 11. Opposed electrodes (not shown) are formed on a surface of the opposed substrate 12 opposed to the drive substrate 11. For the opposed substrate 12, an irradiated region 12a is a region opposed to the irradiated region 11a in the drive substrate 11 and a non-irradiated region 12b is a region other than the irradiated region 12a. An upper section of the drive substrate 11 is wider than the opposed substrate 12. A flexible connector 14 for external connection is connected to the widened section of the drive substrate 11.

In the embodiment a light-shielding substrates 15 and 16 are each directly bonded to a back of the drive substrate 11 and a front of the opposed substrate 12, respectively, with a low-stress adhesive such as a silicon-base resin and a gel adhesive. Onto an outer surface of the light-shielding substrate 15, a polarizing plate 17 is bonded in an integral manner, for polarizing light emitted from the liquid crystal display device 10. The light-shielding substrates 15 and 16 and the polarizing plate 17 are fixed to a metal frame 18 for heat radiation (cooling) with a heat-conductive adhesive such as a silicon-base resin containing a conductive material like alumina. The light-shielding substrates 15 and 16 and the polarizing plate 17 are thermally coupled to the metal frame 18 as well.

Figure 3:
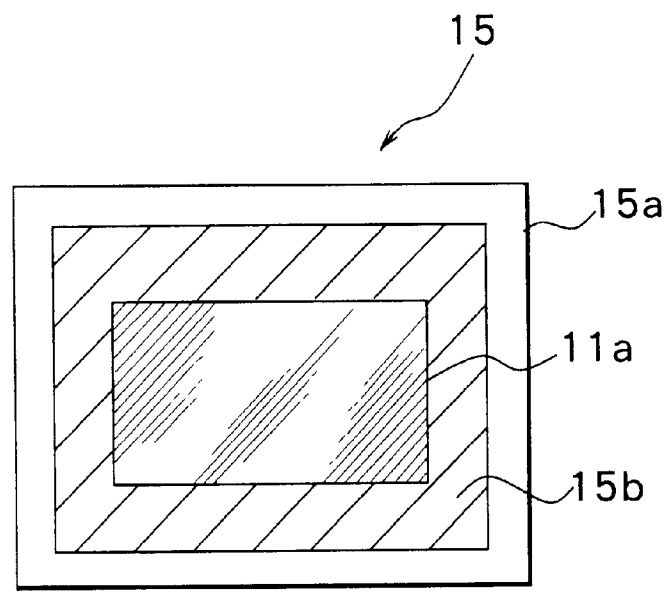
FIG. 3 is a top view of a light-shielding substrate in FIG. 2.

As shown in FIG. 3, frame-shaped light-shielding film 15b formed in a region on a surface of a transparent substrate 15a opposed to the non-irradiated region 11b in the drive substrate 11 to form a light shielding substrate 15. Similarly, with a frame-shaped light-shielding film 16b formed in a region on a surface of a transparent substrate 16a opposed to the non-irradiated region 12b in the opposed substrate 12, for example, to form a light shielding substrate 16. The transparent substrates 15a and 15b are both made of heat resistant glass such as quartz glass. The thickness of the transparent substrates 15a and 16a is each 2 mm or above, for example, so that the thickness does not allow a foreign substance such as dust settling onto the surface thereof to focus on the surface of the drive substrate 11 or the pixels. It is preferable that the light-shielding films 15b and 16b each have an excellent light-shielding property with optical density of 3.0 or above, for example. It is further preferable that the thickness of the light-shielding films 15b and 16b is 20 nm or below in order to suppress stress strain, that is, warpage of the transparent substrates, due to the adhesive for bonding the light-shielding films 15b and 16b to the drive substrate 11 and the opposed substrate 12, respectively. The light-shielding films 15b and 16b may be formed through a printing method, for example, using an epoxy-base resin. Although the light-shielding films 15b and 16b may be made of an insulating material, a conductive film of any of silver (Ag), chrome (Cr), aluminum (Al) carbon (C) and so on may be alternatively formed through vapor deposition, for example, and the conductive film is grounded. As a result, the light-shielding films 15b and 16b further have a function of electrically shielding the liquid crystal display device 10 as well.

In the embodiment as described so far, the light-shielding substrates 15 and 16 are each have the thin light-shielding films 15b and 16b of high light-shielding quality each formed directly on the transparent substrates 15a and 16a, respectively. The light-shielding substrates 15 and 16 are then directly bonded to the outer surface of the drive substrate 11 and the opposed substrate 12, respectively. The light-shielding films 15b and 16b are thus brought to complete surface contact with the surface of the drive substrate 11 and the opposed substrate 12, respectively. As a result, light incident over the non-irradiation regions 11b and 12b of the drive substrate 11 and the opposed substrate 12, respectively, is precisely blocked. In addition, foreign substances such as dust are prevented from entering between the light-shielding film 15b and the drive substrate 11 and between the light-shielding film 16b and the opposed substrate 12. Furthermore, the light-shielding films 15b and 16b are each brought to complete surface contact with the drive substrate 11 and the opposed substrate 12, respectively, so that a layer of air is not formed in between. Consequently, heat produced by incident light is effectively dissipated from the metal frame 18 through the light-shielding substrates 15 and 16. Therefore, cooling ability of the liquid crystal display device 10 is improved without using a large-sized cooling means.

Figure 4:
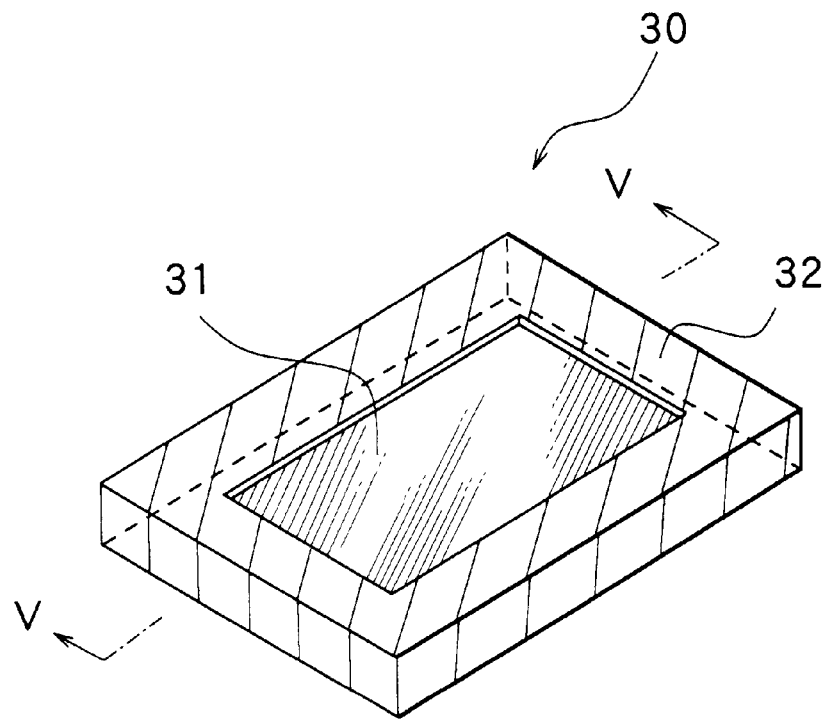
FIG. 4 is a perspective view of a light-shielding substrate of another embodiment of the invention.
Figure 5:
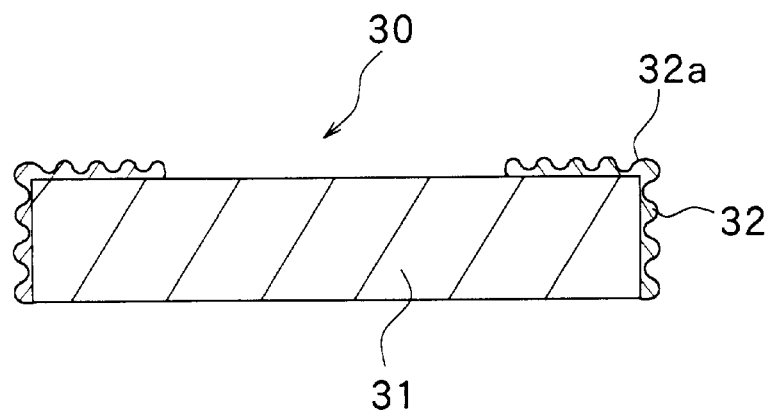
FIG. 5 is a cross section of the light-shielding substrate taken along line V—V in FIG. 4.

FIG. 4 illustrates a light-shielding substrate 30 of another embodiment of the invention. In the foregoing embodiment the light-shielding substrates 15 and 16 each have the partially formed light-shielding films only in the regions opposed to the peripheral circuits in the non-irradiated regions. In contrast, the light-shielding substrate 30 of this embodiment has a black light-shielding film 32 formed all over a region opposed to a non-irradiated region on a surface of a transparent substrate 31 and over sides thereof. The light-shielding film 32 may be formed through vapor deposition, for example. The light-shielding film 32 further has an uneven section 32a over the surface thereof as shown in FIG. 5 illustrating an enlarged cross section taken along line V—V in FIG. 4. As in the foregoing embodiment, the light-shielding film 32 is made of a conductive material such as silver (Ag), chrome (Cr), aluminum (Al), carbon (C) and so on and is grounded.

Since the light-shielding substrate 30 has the black light-shielding film 32 over the sides of the transparent substrate 31 as well, light is prevented from entering through the sides of the transparent substrate 31 and unwanted reflection on the sides is inhibited in addition to the effects of the foregoing embodiment. The uneven section 32a formed over the light-shielding film 32 further suppresses reflection of light.

A liquid crystal projector using the liquid crystal display device as described so far will now be described.

Figure 6:
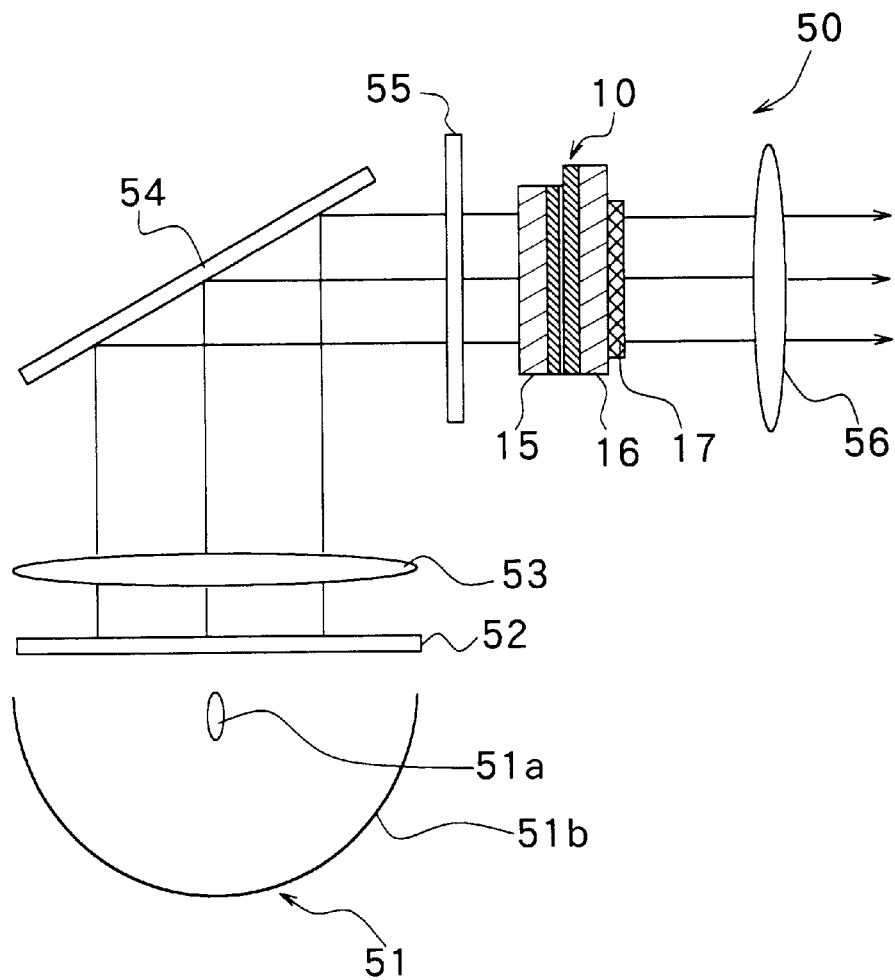
FIG. 6 is a schematic view of a liquid crystal projector using the liquid crystal display device of the invention.

FIG. 6 is a schematic view illustrating a liquid crystal projector 50 using the foregoing liquid crystal display device. The liquid crystal projector 50 comprises: a light source 51 having a metal halide lamp 51a, for example, emitting intense light (white light) and a spheroidal reflecting mirror 51b for reflecting the white light emitted from the metal halide lamp 51a toward the front; a heat-ray cut-off filter 52 for removing unwanted infrared radiation from the white light emitted from the light source 51; a convex lens 53 for converging the light having passed the heat-ray cut-off filter 52; a reflecting mirrors (dichroic mirrors) 54 for separating the light having passed the convex lens 53 into three primary colors of red (R), green (G) and blue (B) and reflecting the separated light (one of the mirrors for one of the colors is only shown in FIG. 6 and the mirrors for the remaining colors are omitted); an incident polarizing plate 55 for linearly polarizing the reflected light separated by the reflection mirror 54; a liquid crystal display device 10 for selectively modulating the light of each color having passed the incident polarizing plate 55 and emitting the light; and a projection lens 56 for synthesizing the light emitted from the liquid crystal display device 10 and projecting the light onto a screen (not shown). The liquid crystal display device 10 may be the one described in the embodiment shown in FIG. 1.

An operation of the liquid crystal projector will now be described.

The heat-ray cut-off filter 52 removes unwanted infrared radiation from the white light emitted from the light source 51. The light goes through the convex lens 53 and is separated into the three primary colors of R, G and B by the reflection mirrors (dichroic mirror) 54. The separated light then passes the incident polarizing plate 55 to enter the liquid crystal display device 10. As previously described, the liquid crystal display device 10 has the light-shielding substrates 15 and 16. Therefore light incident over the non-irradiated regions of the liquid crystal display device 10 is selectively shielded while light incident over the irradiated regions is only admitted. The light of each color incident over the irradiated regions of the liquid crystal display device 10 is selectively modulated. The light modulated passes through the outgoing polarizing plate 17 to be converged and synthesized at the projection lens 56. An image is thereby projected onto the projection screen (not shown).

In the liquid crystal projector 50 of the embodiment as thus described, the light-shielding substrates 15 and 16 each placed on the outer surfaces of the drive substrate 11 and the opposed substrate 12, respectively, selectively shield intense light from the light source 51 incident over the liquid crystal display device 10. Reduction in liquid crystal quality due to the irradiated regions (the drive elements) heated to a high temperature by the intense light is thus suppressed. Quality of an image projected in magnification will be therefore improved.

The present invention is not limited to the embodiments described so far but may be practiced in still other ways. In the foregoing embodiments, for example, the light-shielding substrates are each brought to absolute contact with the drive substrate 11 and the opposed substrate 12, respectively. Alternatively, the light-shielding substrate may be provided for either the drive substrate 11 or the opposed substrate 12. However, it is preferable that the light-shielding substrate is placed at least on the incident side (the opposed substrate's side). Furthermore, instead of the light-shielding film 32 formed over the front surface and the sides of the transparent substrate 31 in the embodiment illustrated in FIG. 4, a black adhesive may be applied to the sides of the transparent substrate 31. Although the foregoing embodiments describe the color liquid crystal projector, the invention is also applicable to a black-and-white liquid crystal projector.

As described so far, the liquid crystal display device of the invention has the light-shielding substrate with the light-shielding film brought to absolute contact with the outer surface of at least either the first substrate or the second substrate. As a result, light incident over the regions other than the irradiated regions is precisely blocked. In addition, dust and the like is prevented from entering between the light-shielding substrate and the substrate.

The liquid crystal display device of the invention may be formed with the light-shielding film made of a conductive material. Therefore the shielding effect is further provided by grounding the light-shielding film.

Furthermore, the liquid crystal display device of the invention may comprise the metal frame thermally coupled to the light-shielding substrate. As a result, the cooling effect is further provided by the metal frame dissipating heat. Reduction in liquid crystal quality is therefore prevented.

The liquid crystal projector using the liquid crystal display device of the invention improves image quality.

Obviously many modifications and variations of the present invention are possible in the light of the above teachings. It is therefore to be understood that within the scope of the appended claims the invention may be practiced otherwise than as specifically described.

What is claimed is:

1. A liquid crystal display device comprising:
   a first substrate having a first region, which is irradiated with light corresponding to effective pixels, and a second region, which is not irradiated with light and corresponds to areas other than the effective pixels;

a second substrate having a first region, which is irradiated with light, and a second region, which is not irradiated with light, said first and second regions on said second substrate placed opposite the first and second regions on said first substrates;

a liquid crystal layer held in between said first and second substrates such that said first and second substrates contact said liquid crystal layer; and a light-shielding substrate having a transparent substrate and a light-shielding film formed in a region on the transparent substrate opposite the second region of one of said first and second substrates, wherein said light-shielding substrate has a surface completely contacted with said one of said first and second substrates.

2. The liquid crystal display device according to claim 1, wherein said light-shielding film is made of a material whose optical density is 3 or more and whose thickness is 20 nm or less.

3. The liquid crystal display device according to claim 1, wherein said light-shielding film is made of a conductive material.

4. The liquid crystal display device according to claim 1, further comprising a metal frame thermally coupled to said light-shielding substrate.

5. The liquid crystal display device of claim 1, further comprising a second light shielding substrate having a second transparent substrate and a second light-shielding film formed in a region on the second transparent substrate opposite the second region of the other of said first and second substrates.

6. The liquid crystal display device of claim 1, further comprising a polarizing plate in direct surface contact with said light shielding substrate.

7. The liquid crystal display device of claim 6, further comprising a metal frame thermally coupled to said light shielding substrate and said polarizing plate.

8. A liquid crystal projector comprising:

a liquid crystal display device having a first substrate having a first region, which is irradiated with light corresponding to effective pixels, and a second region, which is not irradiated with light and corresponds to areas other than the effective pixels;

a second substrate having a first region, which is irradiated with light and a second region, which is not irradiated with light, said first and second regions on said second substrate placed opposite the first and second regions on said first substrate;

a liquid crystal layer held in between said first and second substrates such that said first and second substrates contact said liquid crystal layer; and a light-shielding substrate having a transparent substrate and a light-shielding film formed in a region on the transparent substrate opposite the second region of one of said first and second substrates, wherein said light-shielding substrate has a surface completely contacted with said one of said first and second substrates, wherein light from a light source radiates on the effective pixels of said liquid crystal display device and is modulated in said liquid crystal display device in accordance with an image to be reproduced, and wherein the image is projected by the liquid crystal display device onto a projection screen for display.

9. The liquid crystal projector according to claim 8 wherein said light-shielding film is made of a material whose optical density is 3 or more and whose thickness is 20 nm or less.

10. The liquid crystal projector according to claim 8, wherein said light-shielding film is made of a conductive material.

11. The liquid crystal projector according to claim 8, further comprising a metal frame thermally coupled to said light-shielding substrate.

12. The liquid crystal display device of claim 8, further comprising a second light shielding substrate having a second transparent substrate and a second light-shielding film formed in a region on the second transparent substrate opposite the second region of the other of said first and second substrates.

13. The liquid crystal display projector of claim 8, further comprising a polarizing plate in direct surface contact with said light shielding substrate.

14. The liquid crystal display projector of claim 13, further comprising a metal frame thermally coupled to at least one of said light shielding substrate and said polarizing plate.

* * * * *